United States Patent [19]

Bordat

[11] Patent Number: 4,508,047
[45] Date of Patent: Apr. 2, 1985

[54] CONNECTIONS BETWEEN DIVIDING WALLS, PARTICULARLY FOR THE CONSTRUCTION OF BOAT HULLS

[75] Inventor: Andre J. E. Bordat, Rueil Malmaison, France

[73] Assignee: Constructions Mecaniques de Normandie, Paris, France

[21] Appl. No.: 486,596

[22] Filed: Apr. 19, 1983

[30] Foreign Application Priority Data

Apr. 21, 1982 [FR] France ................................ 82 06875

[51] Int. Cl.³ .......................... B63B 3/00; B63B 3/48; B63B 3/56; B63B 5/24
[52] U.S. Cl. ...................................... 114/355; 52/281; 52/285; 114/78; 114/82; 114/85; 114/88; 114/357; 114/358
[58] Field of Search ......................... 52/259, 285, 281; 114/355, 357, 78, 88, 358, 65 R, 82, 85; 403/170, 217, 295

[56] References Cited

U.S. PATENT DOCUMENTS 1,447,827  3/1923  Warner ................................. 52/285
2,141,397 12/1938  Locke ................................ 52/285 X
3,994,105 11/1976  Jamison et al. .................... 52/285 X

FOREIGN PATENT DOCUMENTS 824548 11/1951  Fed. Rep. of Germany ........ 52/281

Primary Examiner—Sherman D. Basinger
Attorney, Agent, or Firm—Larson and Taylor

[57] ABSTRACT

To join together at least two light dividing walls, resisting tensile forces and possibly curved, recourse is had to a plurality of fastenings (4,5) each extending radially in at least one direction from a pivot (6), the pivots of these fastenings being stacked axially along the axis L corresponding to the line of intersection of the mean surfaces of the dividing walls and the contiguous fastenings of the stack being oriented so that they extend alternately along said mean surfaces. The fastenings thus joined together at the level of the pivots form discontinuous wall portions whose roots are mutually imbricated, to which wall portions the dividing walls are then butt-jointed, themselves formed by parallel skins bonded to these wall portions and in which the intermediate space is filled in with foam.

11 Claims, 9 Drawing Figures

4,508,047

CONNECTIONS BETWEEN DIVIDING WALLS, PARTICULARLY FOR THE CONSTRUCTION OF BOAT HULLS

FIELD OF THE INVENTION

The invention relates to connections between dividing walls, more particularly between dividing walls, possibly curved, formed from a light material (plastic material, wood . . . ) and likely to be subjected to mutual wrenching forces at their junction, as is the case for dividing walls formed of plating, decks and internal walls of boat hulls.

It also relates to the assemblies of dividing walls assembled together by means of such connections, assemblies such as boat hulls.

It has especially as its aim to make the connections of the kind in question such that they provide extremely solid assemblies of the dividing walls which they join together.

In what follows there will be designated by the expression "axis L" the line, which may be curved, along which the means surfaces of the dividing walls intersect when they are joined together by a connection of the above type.

SUMMARY OF THE INVENTION

Connections of this kind in accordance with the invention are essentially characterized in that they are formed by a plurality of fastenings each extending radially in at least one direction from a pivot, the pivots of these fastenings being stacked axially along the axis L of the connection considered and the contiguous fastenings of the stack being orientated so that they extend alternately along the means surfaces of the dividing walls to be joined together.

The fastenings corresponding to each of the dividing walls joined together by the same connection are thus mutually imbricated in the fastenings corresponding to the other dividing walls.

In preferred embodiments recourse is further had to one and/or other of the following arrangements:

each fastening is in the general form of a prismatic elongated plate defined by two transverse flat faces perpendicular to axis L and by two flat lateral faces parallel to each other and to axis L, the distance between the two transverse faces is less than the distance between the two lateral faces, the lateral faces of the fastening are covered with a unidirectional fabric in which the component threads extend perpendicularly to axis L, some at least of the fastenings are formed by a U shaped pin whose legs are slightly deformable by bending, some at least of the fastenings are in the form of an H formed by two U shaped pins diametrically opposed with respect to the axis of the pivot, the legs of these Us being slightly deformable by bending, the opening of each U is closed by a foam block, the pivot of each fastening is given material form by a cylindrical bore formed in this fastening and adapted to coact with a rigid rod with axis L, the rod according to the preceding paragraph is a tube made from a resin impregnated glass fabric, the pivot of each fastening is given material form by the assembly of a boss of revolution and a hollow of revolution coaxial with the boss and complementary thereto, the spaces between the fastenings orientated in the same radial direction and corresponding therefore to the same dividing wall are filled by a filling wedge, made more especially from foam, resin impregnated fabric inserts are interposed axially between the different fastenings, the dividing walls joined together by a connection of the above kind are given material form by two glass fabric sheets extending parallel to axis L and bonded laterally to the corresponding fastenings, and a filling material such as foam with spacing inserts filling the space between these two sheets.

The invention comprises, apart from these main arrangements, certain other arrangements which are preferably used at the same time and which will be more explicitly discussed hereafter.

DETAILED DESCRIPTION

In what follows, preferred embodiments of the invention will be described with reference to the accompanying drawings in a way which is of course in no wise limiting.

Figure 1:
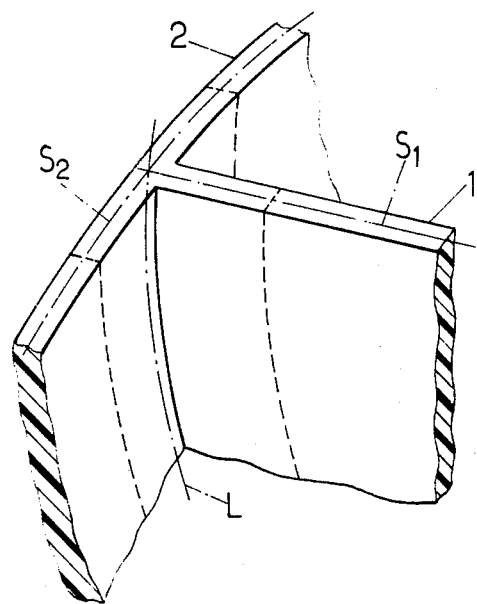

FIG. 1, of these drawings, shows in perspective two dividing wall portions joined together by means of a connection formed in accordance with the invention.

Figure 2:
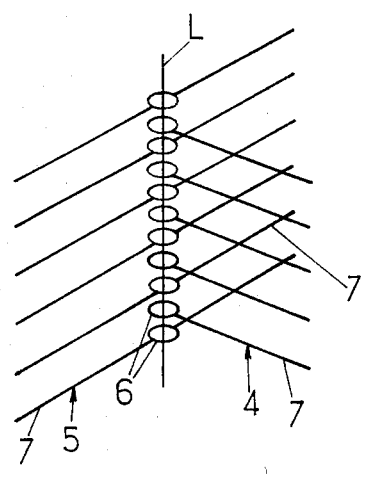
Figure 3:
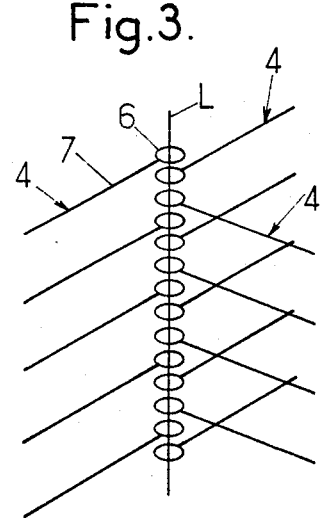
Figure 7:
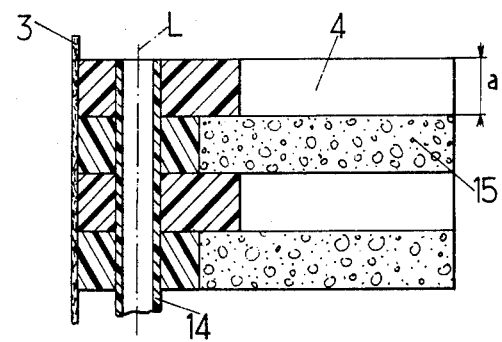
Figure 4:
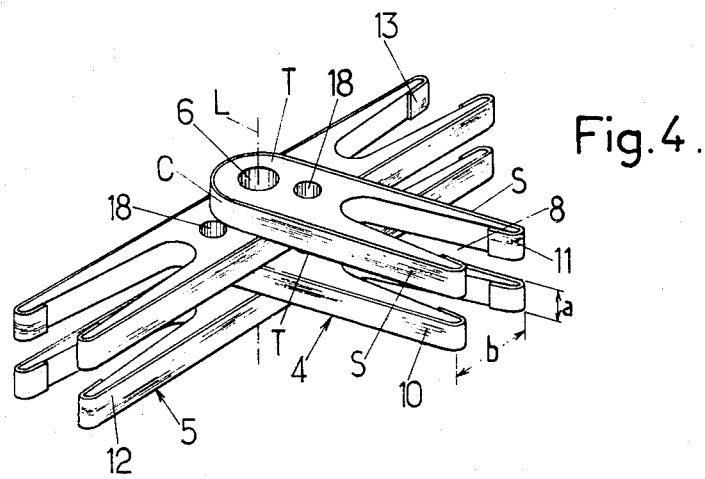
Figure 5:
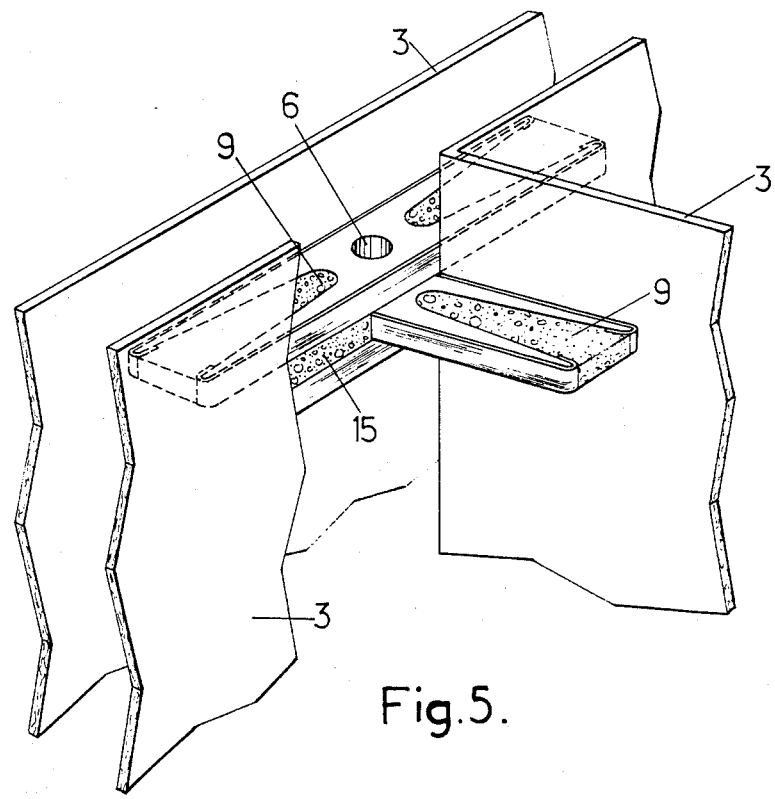
Figure 6:
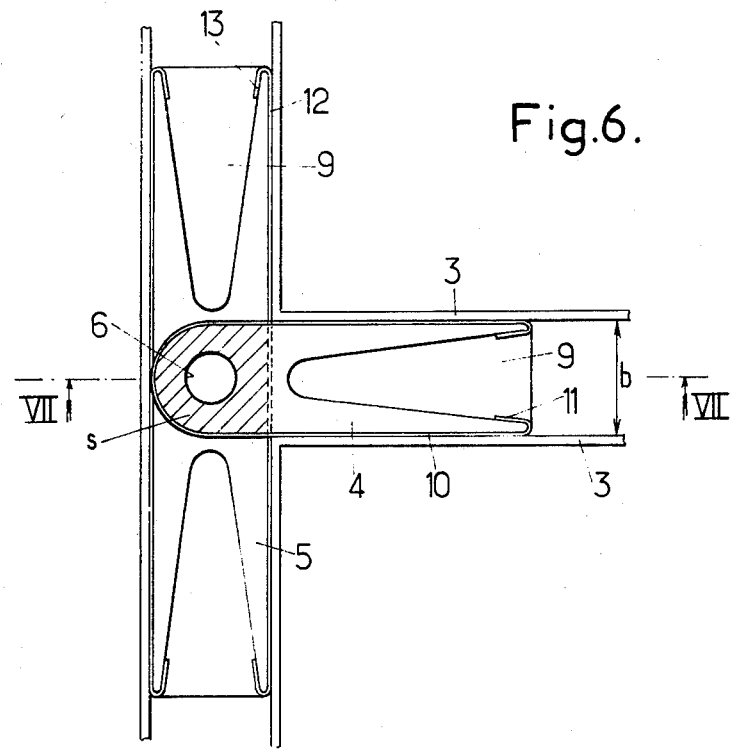
Figure 8:
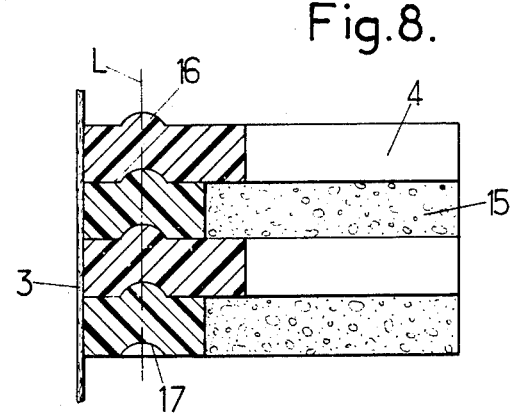
Figure 9:
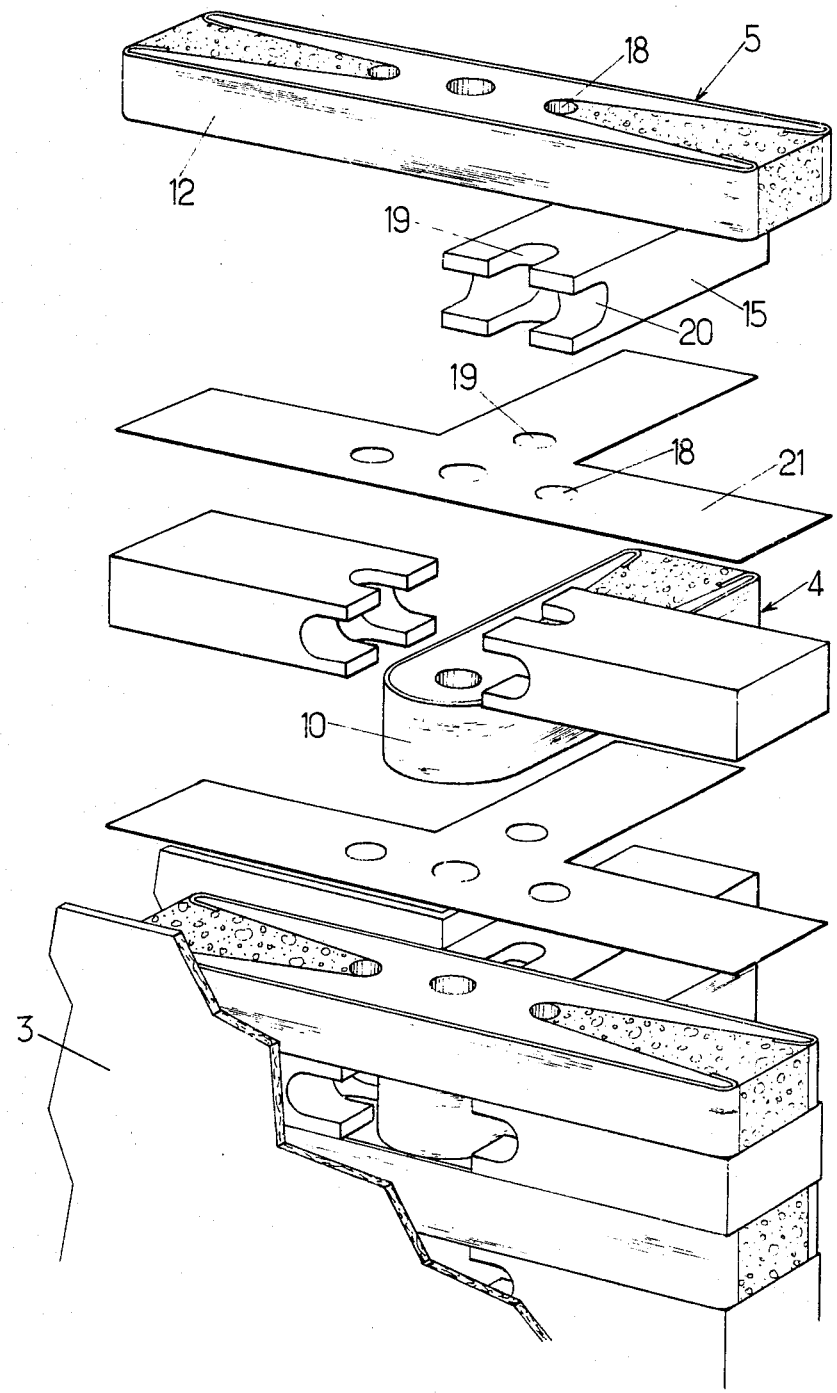

FIGS. 2 and 3 show very schematically two methods of spacing out the fastenings forming such a connection, FIGS. 4 and 5 show in perspective some of the component parts of such a connection at two successive manufacturing stages, FIGS. 6 and 7 show the same connection respectively in an axial view and in an axial section along VII—VII of FIG. 6, FIG. 8 is a variant of FIG. 7, FIG. 9 shows the connection of FIGS. 4 to 7 in another partially exploded perspective view.

Generally, it is proposed to join together two dividing walls 1 and 2 whose mean surfaces $S_1$ and $S_2$ intersect along a line L which will be sometimes called hereafter "axis L" and which may be straight or slightly curved, as illustrated.

These dividing walls 1 and 2 are formed from a light material, more especially from a plastic material or wood.

In a particularly advantageous embodiment, they are formed by two sheets or "skins" 3 formed from a resin impregnated glass fabric or from a glass fiber reinforced resin, these two skins extending parallel to one another and defining therebetween a gap which is filled with a solid material such as a polyurethane foam, rigid spacer elements or distance pieces being further advantageously embedded in this filling.

A preferred application of these dividing walls is the construction of boat hulls, in which said dividing walls form not only the outer platings but also the horizontal decks and vertical walls.

It is known that it is difficult to firmly join such dividing walls together: with known connecting methods, wrenching apart of these dividing walls may be observed at the level of their connections.

To connect the above dividing walls 1 and 2 very firmly together, toothing connections are prepared here comprising divergent wall portions forming the beginnings of walls, which wall portions are very firmly interlocked by imbrication; it is then sufficient to mount the dividing walls properly speaking in the extension of these beginnings, preferably during the very manufacturing phase of said dividing walls.

Each connection is formed by a plurality of fastenings 4, 5 each having a pivot 6 and at least one lug 7 extending radially from this pivot.

The pivots 6 of these fastenings are stacked so that their axes are aligned along the axis L and the lugs 7 of the stacked fastenings are orientated in turn along the mean surfaces $S_1$ and $S_2$ of the dividing walls to be joined together. Thus, a sort of spinal column is formed extending along axis L, in which the vertebrae are extended radially by sorts of parallel ribs or fins spaced apart from each other and forming a plurality of wall portions diverging from this column.

The fastenings or "vertebrae" of the framework thus formed may be a "single" or a "double" type:

the first ones 4, of single type, comprising a single lug 7.

and the second ones 5, of a double type, comprising two identical lugs 7 diametrically opposite each other with respect to axis L, pivot 6 then being located in the center of the fastening.

The embodiment shown schematically in FIG. 1 concerns a T shaped connection formed between a first dividing wall 1 corresponding to the foot of the T and a second dividing wall 2 corresponding to the head of the T: the first dividing wall 1 has then one of its edges at the level of axis L of the connection whereas the second dividing wall 3 extends on each side of this axis, the first one being able to be for example an internal vertical wall of a boat and the second one, a plating or external wall of the shell of this boat.

In this case, the connection considered may be formed by an alternating stack of single fastenings 4 corresponding to dividing wall 1 and double fastenings 2 corresponding to dividing wall 2, as shown in FIG. 2.

Or else, said connection may be formed by an alternating stack of single fastenings 4 orientated successively and alternately in three radial directions corresponding respectively to dividing wall 1 and to two portions of dividing wall 2 separated by axis L, as shown in FIG. 3.

Of course, if the connection relates to the assembly of two dividing walls according to an L shaped angle, it is sufficient to use single fastenings 4 stacked so as to extend radially in turn along the main surface of these two walls.

Similarly, if it is a question of assembling together two dividing walls crossed with respect to each other, an alternating stack of double fastenings may be used, crossed alternately.

This is the assumption of the above T shaped connection which has been chosen purely by way of illustration in the following description and which refers to FIGS. 4 to 9, and more precisely the mode of construction with single and double alternate fastenings in accordance with FIG. 2.

Each single fastening 4 is in the general form of a prismatic plate defined essentially by two flat transverse faces T perpendicular to axis L and spaced apart by a distance a and two flat lateral faces S parallel to each other and to axis L and spaced apart from each other by a distance b.

In other words, lug 7 is defined by a prism whose base is a rectangle with sides a and b.

Distance a is preferably of the order of half the distance b and is advantageously, in practice, between 1 and 6 cm.

In FIGS. 4 to 7 and 9, pivot 6 is given material form by a cylindrical bore with axis L which may be provided by a rigid reinforcing ring (not shown).

The plate portion which surrounds this bore 6 on the side opposite lug 7 with respect to axis L is defined externally by a semi-cylindrical surface C whose generatrices are parallel to axis L and whose directrix is a half circle of diameter b.

This semi-cylindrical surface C is connected tangentially to the two lateral faces S.

A deep notch 8 formed radially in lug 7 from its edge the furthest away from axis L gives to this lug the shape of a pin with two legs.

The material forming the plate, generally a plastic material, is chosen so that the legs of the pin are slightly flexible.

This property may be used for adapting the fastenings to slightly curved shaped dividing walls.

It also has the advantage of making the connection slightly deformable in the direction of its thickness, which confers thereon a better resistance to shocks and to blasts due to explosions.

Notches 8 are subsequently filled by means of filling blocks 9 (FIG. 5) having the desirable flexibility, these blocks being more especially formed from a low density cellular material such as polyurethane foam.

The assembly of the two lateral faces S and of the semi-cylindrical face C which joins them together is advantageously covered by a ribbon made from a unidirectional fabric 10 whose main theads or fibers extend in transverse planes, i.e. perpendicular to axis L.

These ribbons 10 are advantageously positioned by bending back their two ends 11 over the ends of the two legs of the pin towards the inside of notch 8, then by jamming these ends by forcibly introducing into said notch the filling block 9, the firmness of this assembly being of course possibly completed by bonding.

Each double fastening 5 corresponds essentially to the doubling of a single fastening 4; it has the same rectangular profile as this single fastening, and the two notches formed respectively in its two halves confer thereon the general form of an H.

The preceding unidirectional ribbon 10, which extended along a U for a single fastening, is here replaced by two unidirectional ribbons 12 running respectively along the two flat parallel lateral faces of the double H fastening: these two ribbons are again positioned on these faces by jamming their folded back ends 13 into notches 8 by forcibly introducing filling blocks 9 into these notches.

To construct a connection of the above described type by means of such fastenings provided with their filling blocks 9 and their ribbons 10 and 11, these fastenings are stacked by fitting their bores 6 on the same rod 14 (FIG. 7) having axis L.

Rod 14 may be formed from any desirable material, for example from a metal, with any desirable section, for example circular and solid.

In an advantageous embodiment, this rod is formed by a resin impregnated glass fabric tube.

After stacking these fastenings, they are given the above described alternating orientations.

Then prismatic wedges 15 are jointingly inserted between the different parallel radial lugs so as to form with these lugs and wedges wall portions with continuous faces.

The wedges 15 are advantageously formed by a foam having a density just sufficient to allow the assembly to be adapted to curved surfaces.

A connection is thus obtained formed of different toothing wall portions, these portions radiating in several distinct directions from the same column with axis L to which they are very firmly attached.

This attaching is essentially due to the mutual bonding of the transverse surfaces along which the consecutive fastenings of the stack are mutually juxtaposed: such a surface has been shown with hatching at s in FIG. 6.

The firmness of the assembly due to the mutual bonding of these surfaces s is much that it may be useless to provide in addition the shearing strength of rod 14: this rod may even be considered as superfluous and be omitted in some cases.

Instead of being materialized by a bore cooperating with such a rod, pivot 6 of each fastening may be materialized by a boss of revolution 16 (FIG. 8) with axis L, particularly hemispherical in shape, projecting from one of the two transverse faces of the fastening and by a complementary hollow 17 with axis L formed in the other transverse face of said fastening, each boss of a fastening being housed jointingly in the hollow of the contiguous fastening of the stack.

After giving the different wall portions of the connection their final orientation and shape, the whole of the framework is frozen in shape, preferably by flowing an appropriate resin into holes 18, 19, 20 formed beforehand in the different wedges and fastenings, some of which holes (18 and 19) are aligned in parallel with axis L after mounting: the setting of the resin during subsequent polymerization thereof rigidifies this framework.

This rigidification may be completed by also running a polymerizable resin into the tube forming rod 14 if this rod is formed by such a tube.

It is then sufficient to extend the different wall portions forming beginnings of dividing walls by the dividing walls themselves.

This operation is preferably carried out by manufacturing each of said dividing walls as follows: on to each of the two parallel faces of the toothing wall portion concerned are bonded two sheets or skins 3 and the gap between these two skins is filled by any appropriate material such as a synthetic foam and any desirable inserts fulfilling spacing, guiding, stiffening or other roles.

The attachment thus obtained for each dividing wall to the corresponding wall portion is extremely solid, in particular because of the high tensile strength presented by the unidirectional ribbons 10,12 against which the skins 3 are bonded directly.

In FIG. 9, inserts 21 can further be seen made from a glass fabric or similar impregnated with a polymerizable resin: in one advantageous embodiment, each insert, cut out in a T shape, extends transversely and is interposed axially between two contiguous stages of the connection, that is to say between the assembly of a double fastening 5 and a wedge 15 and the assembly of a single fastening 4 and two wedges 15.

Following which and whatever the embodiment adopted, a dividing wall connection is finally obtained whose construction follows sufficiently from what has gone before and which presents with respect to those known heretofore a certain number of advantages, particularly that of great solidity and a relatively simple construction, the manufacture and the assembly of the different fastenings being able to be carried out automatically.

As is evident, and as it follows moreover already from what has gone before, the invention is in no wise limited to those of its modes of application and embodiments which have been more especially considered; it embraces, on the contrary, all variations thereto.

I claim:

1. A connection between at least two dividing walls whose mean surfaces intersect along an axis L, said connection being formed by a plurality of fastenings each extending radially in at least one direction from a pivot, the pivots of said fastenings being stacked axially along the axis L, the contiguous fastenings of the stack being oriented so that they extend alternately parallelly to the mean surfaces of the dividing walls, each fastening having two flat lateral faces parallel to each other and to axis L, said lateral faces of each fastening being covered with fabric ribbon having threads extending perpendicularly to axis L and each dividing wall being limited by two sheets parallel to each other and to axis L and bonded to the ribbons covering the corresponding fastenings.

2. A connection according to claim 1, wherein some at least of the fastenings are formed by a U shaped pins with legs slightly deformable by bending.

3. A connection according to claim 2, wherein the opening of the U is filled in by a foam block.

4. A connection according to claim 2 wherein the lateral U shaped fastening are joined at one end by a semi-cylindrical face and wherein said ribbon covers said semi-cylindrical face and said two lateral faces.

5. A connection according to claim 1, wherein some at least of the fastenings are in the form of an H formed by two U shaped pins diametrically opposed with respect to the axis of the pivot, the legs of the Us being slightly deformable by bending.

6. A connection according to claim 5 wherein the two flat lateral faces of each of said H shaped fastenings are each covered by a fabric ribbon.

7. A connection according to claim 1, wherein the pivot of each fastening is given material form by a cylindrical bore formed in each fastening and adapted to coact with a rigid rod having axis L.

8. A connection according to claim 1, wherein the pivot of each fastening is given material form by the assembly of a boss of revolution and a hollow of revolution coaxial with the boss and complementary thereto.

9. A connection according to claim 1, wherein resin impregnated fabric inserts are interposed axially between the different stages of the stack.

10. A connection according to claim 1 wherein the sheets are formed from a resin impregnated glass fabric or from a glass fiber reinforced resin.

11. A connection according to claim 1 wherein transverse surfaces along which consecutive fastenings of the stack are in adjacency are bonded to each other.

* * * * *